US011561705B2

(12) United States Patent
Smith et al.

(10) Patent No.: US 11,561,705 B2
(45) Date of Patent: Jan. 24, 2023

(54) CENTRALIZED DISCOVERY CONTROLLER STORAGE PROVISIONING

(71) Applicant: DELL PRODUCTS L.P., Round Rock, TX (US)

(72) Inventors: Erik Smith, Douglas, MA (US); Joseph Lasalle White, San Jose, CA (US); Claudio Desanti, Santa Cruz, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 35 days.

(21) Appl. No.: 17/205,612

(22) Filed: Mar. 18, 2021

(65) Prior Publication Data

US 2022/0300176 A1 Sep. 22, 2022

(51) Int. Cl.
*G06F 3/06* (2006.01)
(52) U.S. Cl.
CPC ............ *G06F 3/0629* (2013.01); *G06F 3/067* (2013.01); *G06F 3/0622* (2013.01); *G06F 3/0659* (2013.01); *G06F 3/0683* (2013.01)
(58) Field of Classification Search
None
See application file for complete search history.

(56) References Cited

U.S. PATENT DOCUMENTS

| 11,340,987 B1* | 5/2022 | Gole | G06F 3/0644 |
|---|---|---|---|
| 2018/0335971 A1* | 11/2018 | Borikar | G06F 3/0605 |
| 2020/0081658 A1* | 3/2020 | Choi | G06F 3/0619 |
| 2020/0409893 A1* | 12/2020 | Puttagunta | H04L 69/16 |
| 2021/0019270 A1* | 1/2021 | Li | G06F 13/4204 |
| 2021/0064281 A1* | 3/2021 | Satapathy | H04L 67/1097 |
| 2021/0374060 A1* | 12/2021 | Subbarao | G11C 11/413 |
| 2022/0027054 A1* | 1/2022 | Frolikov | G06F 3/0631 |

* cited by examiner

*Primary Examiner* — Edward J Dudek, Jr.
*Assistant Examiner* — Ralph A Verderamo, III
(74) *Attorney, Agent, or Firm* — North Weber & Baugh LLP (57) ABSTRACT

Embodiments herein comprise a centralized NVMe-oF namespace masking and configuration repository, which may be referenced for convenience herein as a distributed configuration service (DCS). By centralizing the functionality, there is no longer a requirement that each host, network element, and subsystem have its own user interface (UI). DCS embodiments provide a single UI for a number of features, including but not limited to: (1) viewing the list of Host interfaces that are attached to the network and are registered; (2) viewing the list of Subsystem interfaces that are attached to the IP Network and are registered with the DCS; (3) viewing the storage capacity available behind each subsystem interface; and (4) allowing a user to define the Host to Subsystem interface relationships as well as define how much storage should be allocated to each Host.

20 Claims, 6 Drawing Sheets

CENTRALIZED DISCOVERY CONTROLLER STORAGE PROVISIONING

BACKGROUND

A. Technical Field

The present disclosure relates generally to information handling systems. More particularly, the present disclosure relates to registration systems and methods for communication networks such as Storage Area Networks (SANs) that operate in Non-Volatile Memory Express™ over Fabric™ (NVMe-oF™) environments.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With NVMe-oF, the storage provisioning process typically involves the following steps. First, a host that will have storage capacity allocated to it is identified. Typically, the host is identified by retrieving the host's NVMe Qualified Name (NQN) or the host's NQN+Internet Protocol (IP) address(es) of the fabric interfaces that will be used by the host. As well as identifying the host, one or more non-volatile memory (NVM) subsystems that have free space to provide the required storage capacity are identified. From the list of subsystems with available capacity, a subsystem that has interface(s) able to be accessed by the host interface(s) will be identified. Having identified a subsystem, a namespace or namespaces that will be allocated to the host are created or selected on the identified subsystem. The masking on the subsystem is updated to allow the host/host interface(s) to access the provisioned capacity (e.g., one or more namespaces) on a specific subsystem interface. Finally, if required by the transport in use, the zoning on the fabric is updated.

The preceding steps are typically performed by a management and orchestration (M&O) framework by interacting with the NBI (north-bound interface) available on the host(s), network elements, and subsystems. There are, however, problems with this approach. A separate M&O framework is needed and will have to run on customer-owned devices. First, this approach is strongly disliked by end-users. Second, this M&O framework needs to have a plugin for each host, network element, and subsystem type that will be configured. These plugins are typically vendor and model specific. This situation leads to a requirement that each type of device have an NBI that can be used for provisioning. However, not all types of devices can support such features. For example, EBOFs (Ethernet Bunch of Flash) or JBOFs (Just a Bunch of Flash) are typical inexpensive memory devices with limited management features. Thus, these devices would not work in such settings or would need special management user interface (UI) added, which would increase their cost. Third, IP addresses and the credentials that can be used to access the NBI on each device need to be maintained, thereby increasing the overhead costs. Finally, the M&O framework needs to construct a topology view in order to answer the question "are these entities potentially connectable." Once again, implementing such features is costly and requires additional training and skill for administrators.

Accordingly, it is highly desirable to find new, more efficient ways to provisioning storage.

SUMMARY

To address the deficiencies of the prior approaches, embodiments herein comprise a centralized (i.e., network-based) NVMe-oF namespace masking and configuration repository, which may be referenced for convenience herein as a distributed configuration service (DCS). By centralizing the functionality, there is no longer a requirement that each host, network element, and subsystem have its own robust user interface (UI). DCS embodiments provide a single UI for a number of features, including but not limited to: (1) viewing the list of Host interfaces that are attached to the IP Network and are registered with a centralized discovery service or controller (CDC), of which the DCS may be communicatively connected with or may be part of the CDC; (2) viewing the list of Subsystem interfaces that are attached to the IP Network and are registered with the CDC or DCS; (3) viewing the storage capacity available behind each subsystem interface; and (4) allowing a user to define the Host to Subsystem interface relationships as well as define how much storage should be allocated to each Host.

In one or more embodiments, an example methodology flow may be as follows. Hosts and Storage subsystem are connected to a network and register with a centralized service. By way of illustration, a Host interface (I/F) is connected to a network, performs discovery and registration with a name server; similarly, one or more subsystem interfaces are connected to a network, perform discovery and registration with the name server.

In one or more embodiments, the DCS retrieves a list of namespaces from each subsystem, and a storage administrator interacts with the DCS UI to allocate one or more namespaces to a Host and Host interface (e.g., Host A-I/F 0). The DCS may display a list of subsystems, the interfaces that can be reached from a particular host, and the amount of storage capacity available.

In one or more embodiments, the DCS provides the namespace allocation list to a subsystem that was chosen by the storage administrator. In one or more embodiments, the data transferred from the DCS to the subsystem includes a list of one or more masking records, and a masking record may comprise information such as the following:
    Host NVMe Qualified Name (HOSTNQN)
    Host Interface Transport Address (IP Address)
    Host ID
    Subsystem NQN (SUBNQN)
    Subsystem Interface Transport Address (IP Address)
    Namespaces (NSID) that the host has been granted access to In one or more embodiments, once the subsystem receives the configuration information from the DCS, it will update the state of its namespace masking definition and allow the identified host (e.g., Host A-I/F 0) to access the appropriate namespace (e.g., NSID 46) via the appropriate interface (e.g., I/F 1).

Finally, it shall be noted that at least some of the communications or actions contemplated herein may be performed by commands which may be defined, including being defined an industry agreement or standard, or may be defined by a vendor and published.

Some features and advantages of embodiments of the present invention have been generally described in this summary section; however, additional features, advantages, and embodiments are presented herein or will be apparent to one of ordinary skill in the art in view of the figures, specification, and claims hereof. Accordingly, it should be understood that the scope of the present invention shall not be limited by the particular embodiments disclosed in this summary section.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of storage provisioning, aspects of the present disclosure are not so limited. Accordingly, the aspects of the present disclosure may be applied or adapted for use in other contexts.

A. General Introduction

As noted in the Background section, prior approaches to the storage provisioning process within NVMe-oF environments suffer from several drawbacks. A primary drawback is the need for a management and orchestration (M&O) framework to interact with the NBI (north-bound interface) available on the hosts, network elements, and NVM subsystems. However, because not all devices support such functionality, prior provisioning methods were more limited, more costly, and more involved.

The typical storage provisioning process involves the coordination of at least two administrators. A storage administrator and SAN administrator typically must work together, in which the SAN administrator creates the zoning database and the storage administrator allocate one or more namespaces to a zoned host. As noted above, these types of approaches require SAN administrator interfaces and storage administrator interfaces.

Accordingly, to address the deficiencies of the prior approaches, embodiments herein comprise a centralized (i.e., network-based) NVMe-oF namespace masking and configuration repository, which may be referenced herein as a distributed configuration service (DCS). By centralizing the functionality, there is no longer a requirement that each host, network element, and subsystem have its own robust user interface (UI). DCS embodiments provide a single UI for a number of features, including but not limited to:

(1) viewing the list of Host interfaces that are attached to the IP Network and are registered with a centralized discovery service or controller (CDC), of which the DCS may be communicatively connected with or may be part of the CDC;

(2) viewing the list of Subsystem interfaces that are attached to the IP Network and are registered with the CDC or DCS;

(3) viewing the storage capacity available behind each subsystem interface; and (4) allowing a user to define the Host to Subsystem interface relationships as well as define how much storage should be allocated to each Host.

In one or more embodiments, a centralized configuration repository, referred to above as the DCS, uses the configuration information discussed above to perform various functions. For example, the centralized configuration repository can be used to generate the appropriate Zones and Zone-Groups that enable the appropriate connectivity between Host and Subsystem interfaces. In one or more embodiments, this centralized repository may be deployed as a service running under the control of a StFS (Storage Fabric Services), which may also be referred herein as a centralized discovery controller or service (CDC). Embodiments of Storage Fabric Services that can provide or support centralized discovery controller or services are disclosed in commonly-owned U.S. patent application Ser. No. 16/820,547, filed on 16 Mar. 2020, entitled "DISCOVERY CONTROLLER REGISTRATION OF NON-VOLATILE MEMORY EXPRESS (NVMe) ELEMENTS IN AN NVMe-OVER-FABRICS (NVMe-oF) SYSTEM," listing Erik Smith, Joseph White, David Black, and Raja Subbiah as inventors, which patent document is incorporated by reference herein in its entirety.

In one or more embodiments, a masking definition may be generated in the centralized configuration repository, which is provided to each subsystem interface as configuration changes are made. These changes may be communicated to the subsystem interface by either: a notification (e.g., an AEN (Asynchronous Event Notification)), in which, upon reception of the AEN, the subsystem retrieves the masking definition; or by a push notification from the DCS to the subsystem interface via a new NVMe-oF command.

In one or more embodiments, these notifications may be done using in-band commands. By using in-band commands, embodiments drastically reduce interoperability concerns, eliminate the need for vendor-specific plugins, and eliminate the need to track NBI interface addresses and credentials.

Embodiments also eliminate the need to discover and build a topology view; for example, if Hosts or Storages are in the same name server, they are potentially connectable.

Embodiments also support the configuration of groups of very simple/small subsystems (e.g., EBOFs) in a scalable way. In other words, users will not need to configure each EBOF individually.

B. System and Method Embodiments

Figure 1:
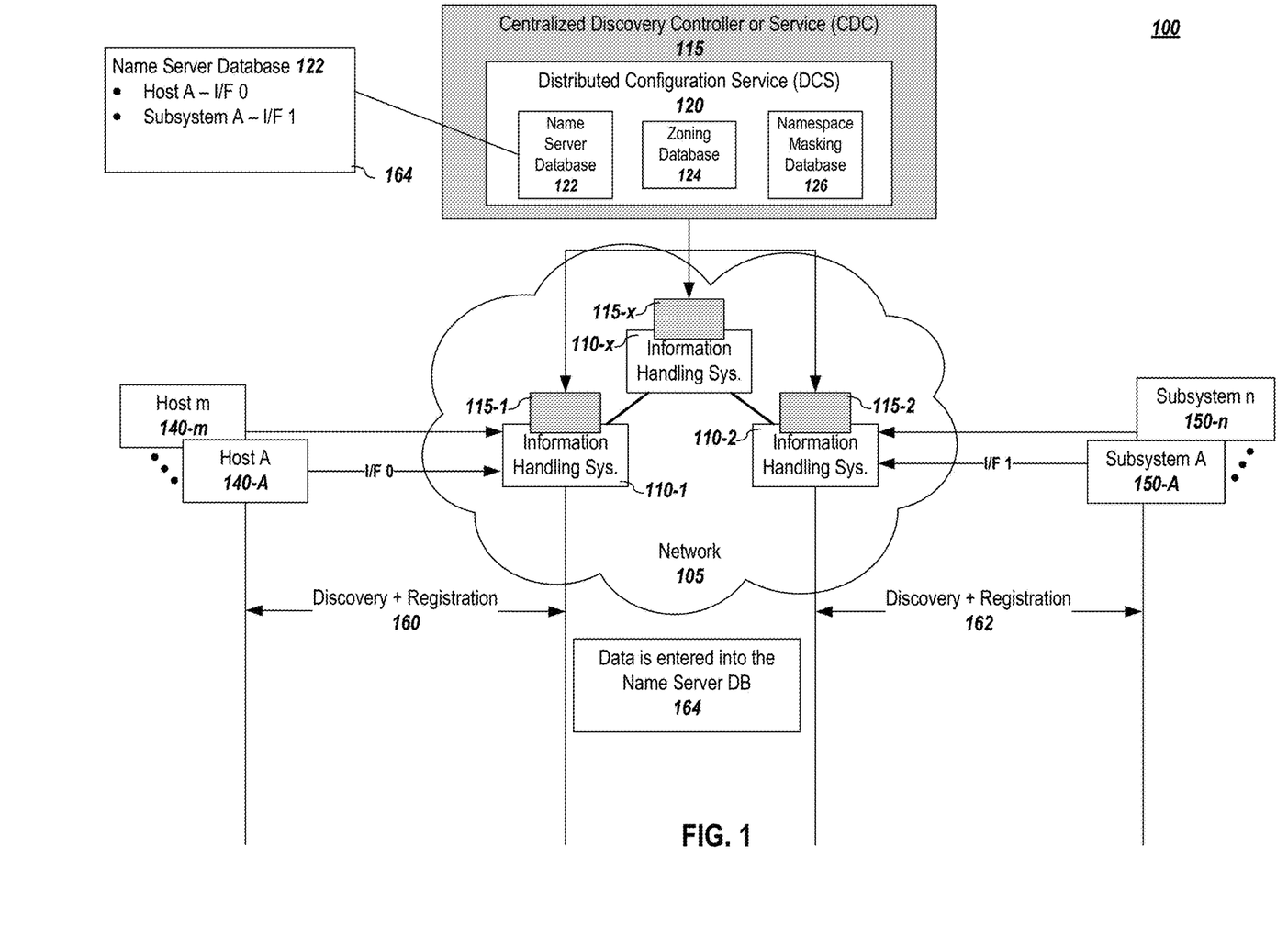
FIG. 1 depicts an example Non-Volatile Memory express over Fabric (NVMe-oF) system with a centralized configuration repository, according to embodiments of the present disclosure.

FIG. 1 depicts an example Non-Volatile Memory express over Fabric (NVMe-oF) system with a centralized configuration repository, according to embodiments of the present disclosure. Depicted in FIG. 1 is an NVMe-oF network 100, which comprises a number of host systems 140 connected to a network 105, and a number of NVM subsystems 150 also connected to the network 105. The network 105 comprises a fabric of information handling systems 110.

In one or more embodiments, one or more information handling systems 110 comprise a centralized configuration repository, which may be referred to herein as a distributed configuration service (DCS) 120. In one or more embodiments, the DCS 120 may be part of a centralized discovery service or controller (e.g., CDC 115); alternatively, the DCS 120 and the CDC 115 may be separate services that communicate. As illustrated in FIG. 1, the DCS 120 comprises three databases—a name server database 122, a zoning database 124, and a namespace masking database 126. The function or use of each database is discussed in more detail below.

FIG. 1 also depicts a method flow, according to embodiments of the present disclosure. The method flow will be illustrated in terms of host A 140-A and subsystem A 150-A; however, it should be noted that the method flow may be performed with any number of hosts and any number of subsystems. As illustrated, host and storage discover (160 and 162) the centralized discovery controller or service (CDC) 115 and/or the distributed configuration service (DCS) 120 and registers their information with the service. It shall be noted that discovery and registration may be performed explicitly or implicitly in any numbers of ways, including as part of logins, direct configuration (e.g., command line interface), multicast DNS (domain name server), an underlying protocol (such as DHCP), software defined storage, etc. Embodiments of centralized storage fabric services, such as registration, including explicit and implicit registration, are disclosed in commonly-owned U.S. patent application Ser. No. 16/898,216, filed on 10 Jun. 2020, entitled "IMPLICIT DISCOVERY CONTROLLER REGISTRATION OF NON-VOLATILE MEMORY EXPRESS (NVME) ELEMENTS IN AN NVME-OVER-FABRICS (NVME-OF)," listing Erik Smith, Joseph White, David Black, and Raja Subbiah as inventors, and in commonly-owned U.S. patent application Ser. No. 16/820,547, filed on 16 Mar. 2020, entitled "DISCOVERY CONTROLLER REGISTRATION OF NON-VOLATILE MEMORY EXPRESS (NVMe) ELEMENTS IN AN NVMe-OVER- FABRICS (NVMe-oF) SYSTEM," listing Erik Smith, Joseph White, David Black, and Raja Subbiah as inventors. Each of the aforementioned patent documents are incorporated by reference herein in its entirety.

Regardless of the underlying mechanism for discovery and registration, the DCS 120 receives information about elements attached to the network 105 and includes (or registers) (164) their information into a name server database 122. For sake of illustration, an expanded view of the name server database 122 is shown with entries resulting from the discovery registration processes 164. Note that the entry shows host A-interface 0 and subsystem A-interface 1 have entries in the nameserver database.

Figure 2:
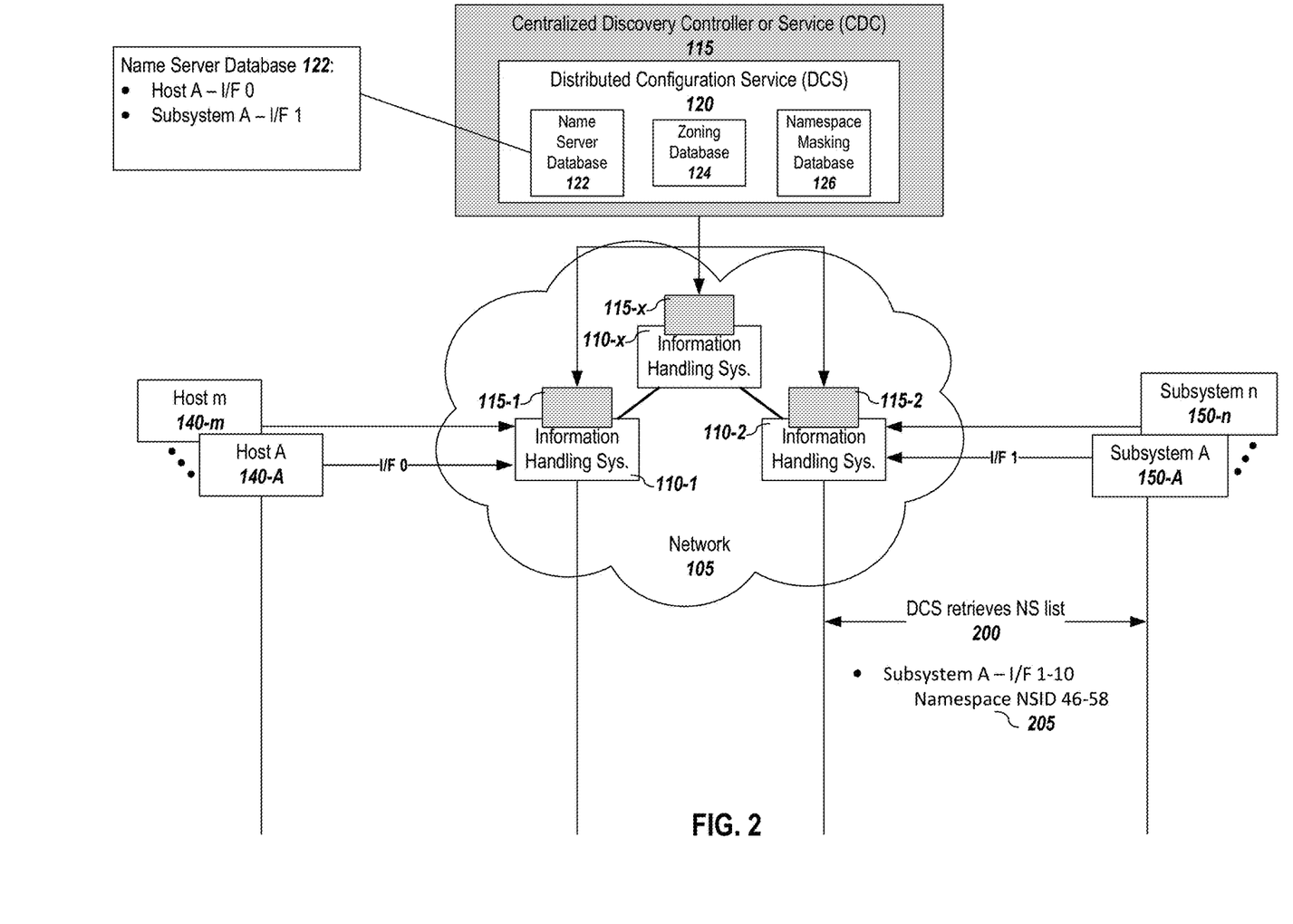
FIG. 2 depicts a next phase in the method flow, according to embodiments of the present disclosure.

FIG. 2 depicts a next phase in the method flow, according to embodiments of the present disclosure. As illustrated, the DCS 120, which is now aware of subsystem A 150-A due to its registration in the name server database 122, sends a request (200) to receive a listing of namespaces for subsystem A 150-A. In one or more embodiments, this request may be in the form of a command such as "get namespace list." In response to the request, the subsystem A 150-A returns a listing of relevant interfaces and the namespaces that can be accessed via those interfaces. For example, in the illustrated example, the subsystem 150A returns (205) interfaces 1 through 10 as being its interfaces and that namespace identifiers NSID 46-58 are available via those interfaces. In one or more embodiments, the returned information may also include the amount of available storage.

Figure 3:
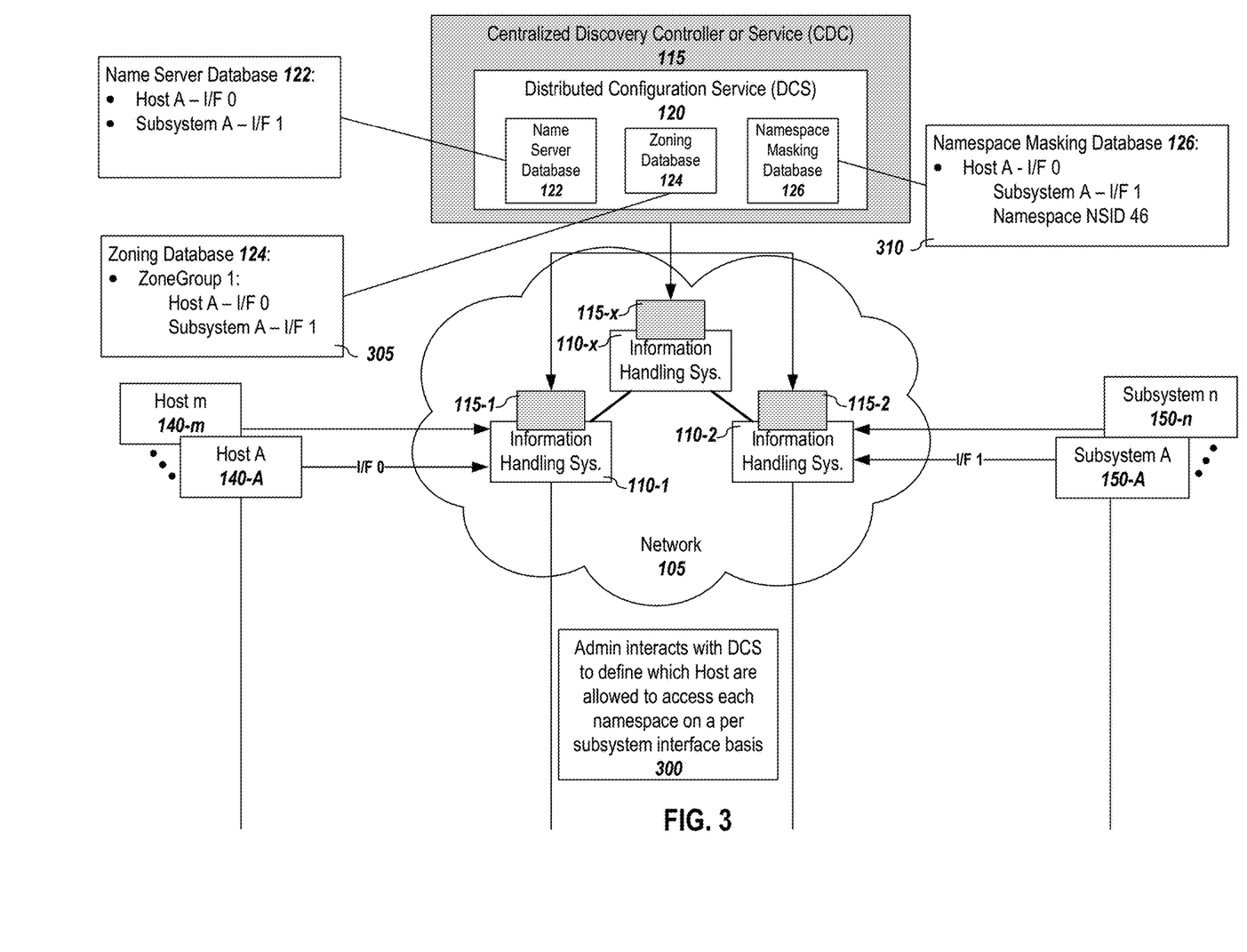
FIG. 3 depicts a next phase in the method flow, according to embodiments of the present disclosure.

FIG. 3 depicts a next phase in the method flow, according to embodiments of the present disclosure. In one or more embodiments, an administrator may interact (300) with the DCS 120 to define which hosts are allowed to access certain namespaces on a per subsystem interface basis. For example, an administrator may access the DCS 120 directly (or via the CDC 115) to configure storage access for hosts via a user interface. Note that, in embodiments, the administrator can utilize the registered information in the name server database 122 and the namespace information (e.g., information 205 in FIG. 2) retrieved from storage subsystems that comprises interfaces of the storage subsystems and the namespace storages accessible via the interfaces to aid in defining the host-namespace/storage access. In one or more embodiments, the access may be defined by creating (305) a zone entry in a zoning database 124 that identifies the host via a specified host interface is allowed to access the storage subsystem via a specified interface of the storage subsystem and by creating (310) a namespace masking definition entry in a namespace masking database 126 that identifies the host via the specified host interface is allowed to access a namespace on the storage subsystem via the specified interface of the storage subsystem. One skilled in the art shall recognize that the network element (host or subsystem) and interface information between the zoning database and the namespace masking database are essentially the same with the exception of the addition of the namespace identifier for the namespace masking database entry. Thus, in one or more embodiments, the admin interface process to configure these entries may be combined into a single step in which both entries are created and the resultant notifications or configurations sent. In this depicted example, a zoning database entry, ZoneGroup 1, is created with Host A-I/F 0 and Subsystem A-I/F 1 as members. Similarly, in the namespace masking database, the entry indicates that Host A-I/F 0 is able to connect with Subsystem A-I/F 1, that provides access to namespace identifier NSID 46.

Figure 4:
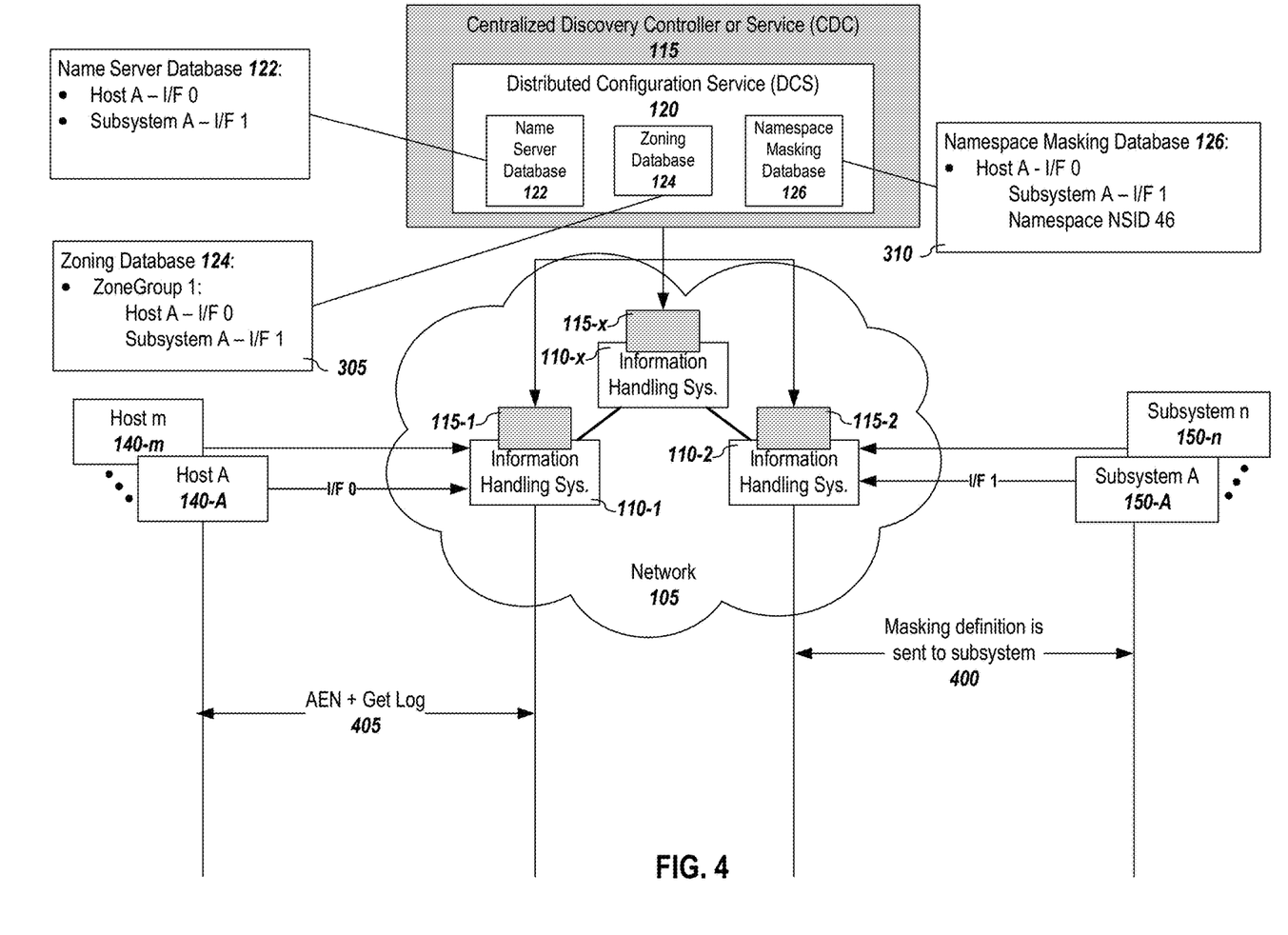
FIG. 4 depicts a next phase in the method flow, according to embodiments of the present disclosure.

FIG. 4 depicts a next phase in the method flow, according to embodiments of the present disclosure. In one or more embodiments, the DCS, given the entry 310 in the namespace masking database 126, sends (400) the namespace masking information related to the namespace masking definition entry 310 to the storage subsystem. In the illustrated example, the DCS 120 send the masking definition information to the Subsystem A 150-A. In one or more embodiments, the masking record or masking definition information may comprise information such as the following:

Host NVMe Qualified Name (HOSTNQN)
Host Interface Transport Address (IP Address)
Host ID
Subsystem NQN (SUBNQN)
Subsystem Interface Transport Address (IP Address)
Namespaces (NSID) that the host has been granted access to The information may be pushed to the subsystem or requested by the subsystem. For example, in one or more embodiments, the DCS may push the namespace masking information to the relevant subsystem in response to creation of the namespace masking definition entry in the namespace masking database.

Alternatively, the DCS may send a notification (e.g., an asynchronous event notification (AEN)) to the relevant subsystem. Upon receipt of the AEN, the subsystem may request from the DCS the namespace masking information related to the namespace masking definition entry, which the DCS sends to the subsystem following receipt of the request.

In either event, the information sent to the storage subsystem may be used to configure the subsystem's access control policy, thereby granting access to the appropriate host(s).

Note that the host may be notified in like manner. For example, in one or more embodiments, the DCS/CDC may send an AEN to the relevant host, which in term may send a "Get Log Page" command to obtain the subsystem information and establish a connection (e.g., via Fabric connect).

It shall be noted that these embodiments require only a single user interface to the DCS 120 in order to facilitate the provisioning. Thus, these embodiments provide a simpler, more uniform, and more efficient approach to provisioning. Furthermore, as noted previously, not all subsystems (e.g., EBOFs/JBOFs) have the capability to support its own UI; thus, embodiments help provide configuration/provisioning support for such devices. Finally, as the number and complexity of storage systems and storage area network expand, embodiments herein provide for greater and easier scalability since provisioning can be accomplished via the centralized DCS regardless of the end network element, its vendor, its capabilities, or the number of such devices.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price.

The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
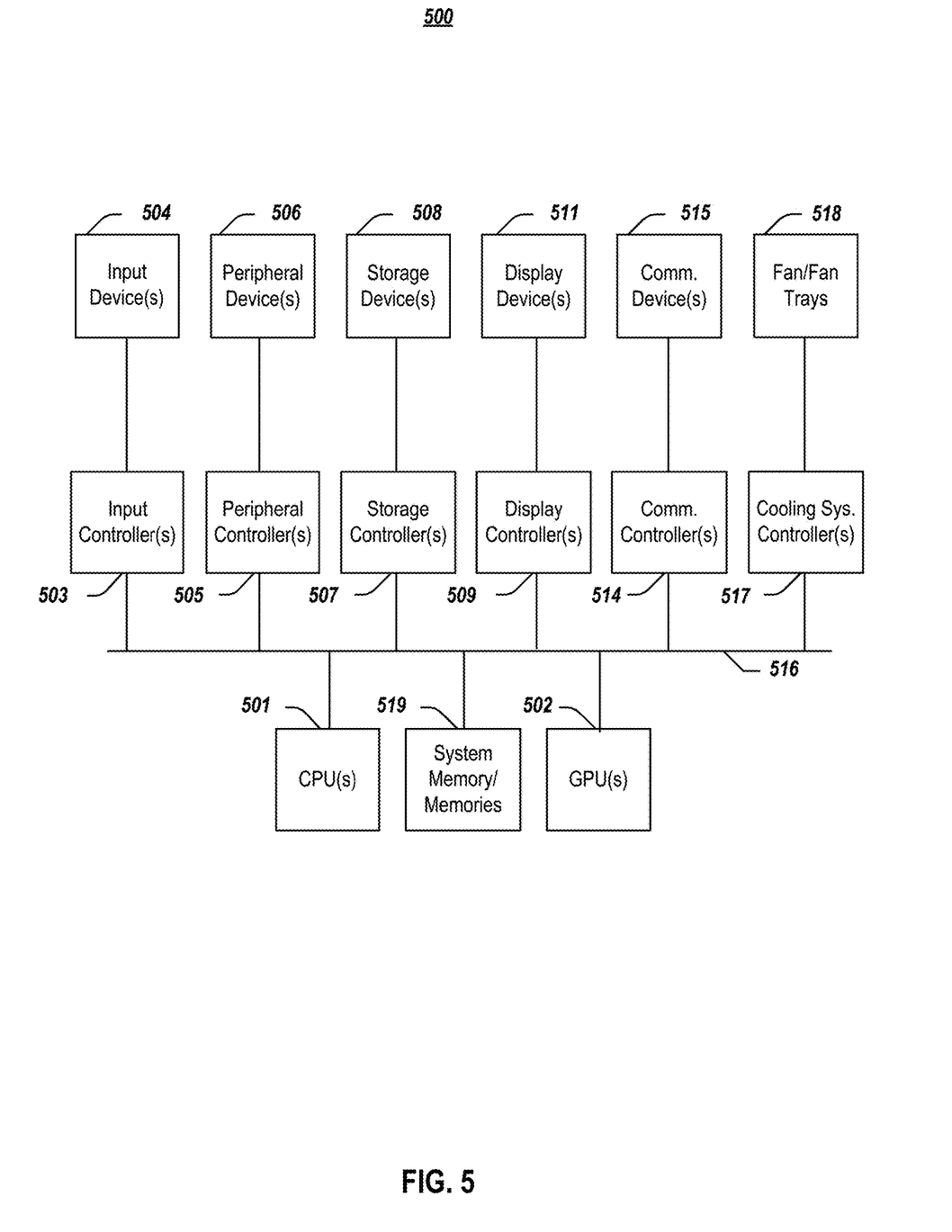
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
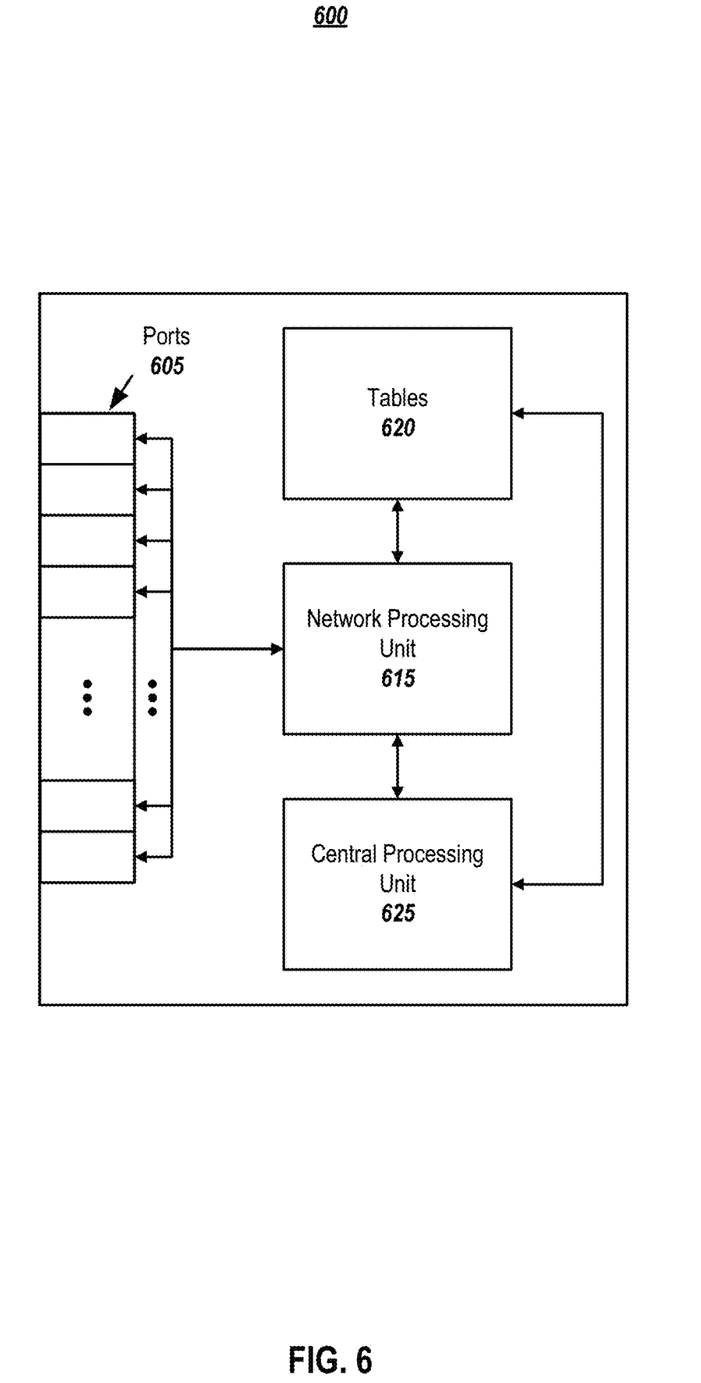
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
    at a centralized configuration service, retrieving from a storage subsystem namespace information comprising one or more interfaces of the storage subsystem and one or more namespaces accessible via the one or more interfaces;
    creating a zone entry in a zoning database that identifies a host via a specified host interface is allowed to access the storage subsystem via a specified interface of the storage subsystem;
    creating a namespace masking definition entry in a namespace masking database that identifies the host via the specified host interface is allowed to access a namespace on the storage subsystem via the specified interface of the storage subsystem; and
    sending namespace masking information related to the namespace masking definition entry to the storage subsystem.

2. The computer-implemented method of claim 1 further comprising the steps of:
    receiving, at the centralized configuration service, registration information regarding a host and a storage subsystem that are connected to a network; and
    entering at least some of the registration information about the host and the storage subsystem into a name server database.

3. The computer-implemented method of claim 2 wherein the centralized configuration service is part of a centralized discovery service that is discovered by the host and the storage subsystem and receives the registration information about the host and the storage subsystem.

4. The computer-implemented method of claim 1 wherein the steps of creating the zone entry in the zoning database and creating the namespace masking definition entry in a namespace masking database are created in response to receiving masking information from an administrator that identifies that the host via its specified interface is allowed to access one or more namespaces on the storage subsystem via the specified storage subsystem interface.

5. The computer-implemented method of claim 2 wherein the name server database, the zoning database, and the namespace masking database are maintained by the centralized configuration service.

6. The computer-implemented method of claim 1 wherein the centralized configuration service is a distributed service that exists on multiple information handling system within a network.

7. The computer-implemented method of claim 1 wherein the step of sending namespace masking information related to the namespace masking definition entry to the storage subsystem comprises:
    pushing the namespace masking information in response to creation of the namespace masking definition entry in the namespace masking database.

8. The computer-implemented method of claim 1 wherein the step of sending namespace masking information related to the namespace masking definition entry to the storage subsystem comprises:
    sending an event notification to the storage subsystem in response to creation of the namespace masking definition entry in the namespace masking database; and
    sending the namespace masking information related to the namespace masking definition entry to the storage subsystem in response to receive a request for the namespace masking information from the storage subsystem.

9. A system comprising:
    one or more processors; and
    a non-transitory computer-readable medium or media comprising one or more sets of instructions which, when executed by at least one of the one or more processors, causes steps to be performed comprising:
        at a centralized configuration service, retrieving from a storage subsystem namespace information comprising one or more interfaces of the storage subsystem and one or more namespace storages accessible via the one or more interfaces;
        creating a zone entry in a zoning database that identifies a host via a specified host interface is allowed to access the storage subsystem via a specified interface of the storage subsystem;
        creating a namespace masking definition entry in a namespace masking database that identifies the host via the specified host interface is allowed to access a namespace on the storage subsystem via the specified interface of the storage subsystem; and sending namespace masking information related to the namespace masking definition entry to the storage subsystem.

10. The system of claim 9 wherein the non-transitory computer-readable medium or media further comprises one or more sequences of instructions which, when executed by at least one processor, causes steps to be performed comprising:
receiving, at the centralized configuration service, registration information regarding a host and a storage subsystem that are connected to a network; and
entering at least some of the registration information about the host and the storage subsystem into a name server database.

11. The system of claim 10 wherein the centralized configuration service is part of a centralized discovery service that is discovered by the host and the storage subsystem and receives the registration information about the host and the storage subsystem.

12. The system of claim 9 wherein the steps of creating the zone entry in the zoning database and creating the namespace masking definition entry in a namespace masking database are created in response to receiving masking information from an administrator that identifies that the host via its specified interface is allowed to access one or more namespaces on the storage subsystem via the specified storage subsystem interface.

13. The system of claim 9 wherein a name server database, the zoning database, and the namespace masking database are maintained by the centralized configuration service.

14. The system of claim 9 wherein the step of sending namespace masking information related to the namespace masking definition entry to the storage subsystem comprises:
pushing the namespace masking information in response to creation of the namespace masking definition entry in the namespace masking database.

15. A non-transitory computer-readable medium or media comprising one or more sequences of instructions which, when executed by at least one processor, causes steps to be performed comprising:
at a centralized configuration service, retrieving from a storage subsystem namespace information comprising one or more interfaces of the storage subsystem and one or more namespace storages accessible via the one or more interfaces;
creating a zone entry in a zoning database that identifies a host via a specified host interface is allowed to access the storage subsystem via a specified interface of the storage subsystem;
creating a namespace masking definition entry in a namespace masking database that identifies the host via the specified host interface is allowed to access a namespace on the storage subsystem via the specified interface of the storage subsystem; and
sending namespace masking information related to the namespace masking definition entry to the storage subsystem.

16. The non-transitory computer-readable medium or media of claim 15 further comprising one or more sequences of instructions which, when executed by at least one processor, causes steps to be performed comprising:
receiving, at the centralized configuration service, registration information regarding a host and a storage subsystem that are connected to a network; and
entering at least some of the registration information about the host and the storage subsystem into a name server database.

17. The non-transitory computer-readable medium or media of claim 16 wherein the centralized configuration service is part of a centralized discovery service that is discovered by the host and the storage subsystem and receives the registration information about the host and the storage subsystem.

18. The non-transitory computer-readable medium or media of claim 15 wherein the steps of creating the zone entry in the zoning database and creating the namespace masking definition entry in a namespace masking database are created in response to receiving masking information from an administrator that identifies that the host via its specified interface is allowed to access one or more namespaces on the storage subsystem via the specified storage subsystem interface.

19. The non-transitory computer-readable medium or media of claim 16 wherein the name server database, the zoning database, and the namespace masking database are maintained by the centralized configuration service.

20. The non-transitory computer-readable medium or media of claim 15 wherein the step of sending namespace masking information related to the namespace masking definition entry to the storage subsystem comprises:
pushing the namespace masking information in response to creation of the namespace masking definition entry in the namespace masking database.

* * * * *